Figure 1:
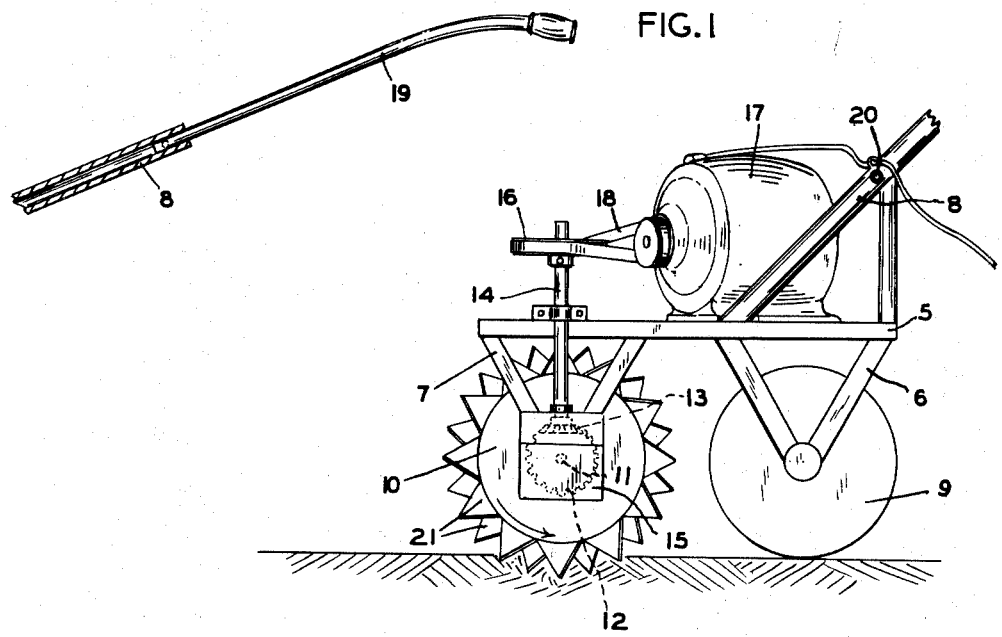

Oct. 13, 1953   J. SOEHL ET AL   2,655,361
ENSILAGE CUTTER
Filed Nov. 12, 1949

INVENTORS
JOHN SOEHL
WARREN HUFFMAN
BY
*Williamson & Williamson*
ATTORNEYS

Patented Oct. 13, 1953

2,655,361

UNITED STATES PATENT OFFICE 2,655,361

ENSILAGE CUTTER

John Soehl and Warren C. Huffman, Winthrop, Minn.

Application November 12, 1949, Serial No. 126,714

4 Claims. (Cl. 262—20)

1

This invention relates to a machine for cutting and shredding frozen ensilage material.

During the winter, farmers store a portion of their livestock feed in large silos. This ensilage material has a substantial amount of moisture contained therein and during the cold winter months, the top layer, at least, and the outer marginal portion of the material becomes frozen and, as a result, it is extremely hard to remove from the silo. A layer of material freezes around the inner surface of the silo and becomes extremely dangerous because as the central material is used up, this annular layer extends well above the head of the farmer working in the silo and during warm weather, large chunks of this material cave in and create a hazardous situation.

It is an object of our invention to provide a machine for cutting and shredding this frozen ensilage to facilitate removal thereof and to prevent the material from remaining on the inner wall surface, thus producing relatively safe working conditions within the silo.

It is another object to provide a machine for cutting and shredding frozen ensilage material having a rotary drum with a plurality of outstanding teeth thereon and adapted to cut and shred frozen ensilage material within the silo and particularly adapted to remove the material close to the silo wall.

It is still another object to provide a frozen ensilage cutter having a rotary drum with a plurality of outstanding teeth fixed thereto in spiral relation to the outer substantially cylindrical portion of the drum to thereby cut and shred the frozen ensilage and at the same time convey the same toward the center of the silo.

Figure 2:
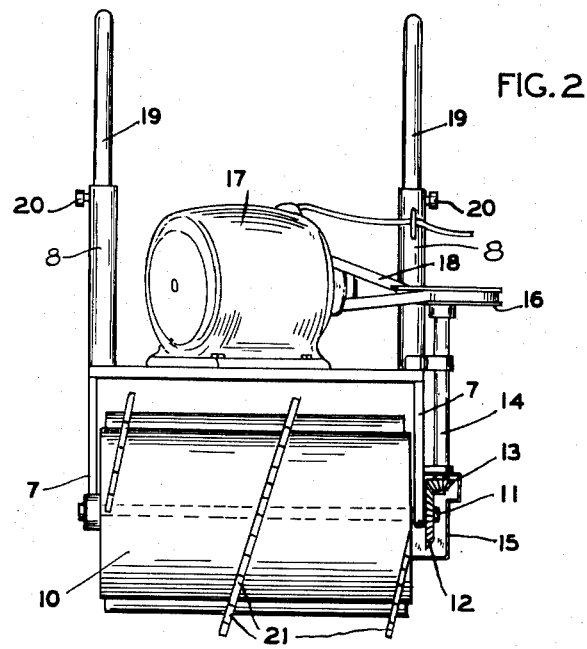

These and other objects and advantages of our invention will more fully appear from the following description made in connection with the accompanying drawings wherein like reference characters refer to the same or similar parts throughout the several views and in which:

Fig. 1 is a side elevational view of our ensilage cutter showing the cutter in operative position and showing the handle broken off with the removed portion of said handle also shown, and Fig. 2 is a front elevational view of the ensilage cutter shown in Fig. 1.

As illustrated in the accompanying drawings, we provide a machine having a supporting structure comprising the platform 5, front struts 6, rear struts 7, and handle supports 8. A front roller 9 is journaled between the front struts 6 and a rear drum 10 is journaled between the rear struts 7. A drive shaft 11 is fixed to drum 10 and has a bevel gear 12 fixed at one end thereof. The gear 12 is meshed with a second bevel gear 13, which is fixed to a depending drive shaft 14. The intermeshed gears 12 and 13 are enclosed by a gear box 15, and a pulley 16 is fixed to the top of shaft 14 for driving the same.

A source of rotary power, such as the electric motor 17, is mounted on the platform 5, and a belt 18 forms the driving connection between motor 17 and pulley 16. A pair of forwardly extending handles 19 are removably mounted in the handle supports 8, as best shown in Fig. 1, and extend forwardly therefrom. The handles 19 are removable to facilitate entrance of the machine into the silo. A pair of set-screws 20 respectively lock the handles in assembled position in the supports 8.

The drum 10 traverses the entire distance between the struts 7 and has a series of outstanding teeth 21 rigidly fixed around the outside thereof in spiral relation around the cylindrical surface thereof. The teeth extend out to the extreme ends of the drum and hence on the end remote from the shaft 14 are disposed in close association to the side extremity of the machine to permit the ensilage material adjacent the side wall of the silo to be removed. The spiral position of the teeth around the drum produces substantially uniform cutting throughout the entire width of the rotary drum 10, and serves to carry the shredded material inwardly toward the center of the silo by conveyor action.

The machine is pulled around on the top surface of the ensilage material with the front roller 9 supporting most of the weight thereof. The rotary drum is constantly rotated to engage the teeth against the top surface of the ensilage to produce uniform shredding of the frozen top crust and completely comminute the material uniformly throughout the entire top surface area, even adjacent the silo wall. The direction of rotation of the drum 10 is shown by the arrow in Fig. 1 which throws the material forwardly toward the operator and conveys the material inwardly toward the center of the silo.

It is essential that the material be finely subdivided to permit the livestock to eat it and eliminate the necessity of waiting for the material to thaw out so that it can be broken down into smaller particles. By providing a cutter for frozen ensilage material we have entirely eliminated a serious and difficult problem.

It will be seen that we have provided a relatively simple, yet highly efficient, cutting and shredding machine particularly adapted for shredding frozen ensilage material and to cut away the material adjacent the silo wall to remove the crust-layer around the inside of the wall and thereby eliminate the dangerous condition created thereby. The cutter teeth serve the dual function of not only cutting and shredding the material, but also of conveying said material inwardly toward the center of the silo.

It will, of course, be understood that various changes may be made in the form, details, arrangement and proportions of the parts without departing from the scope of our invention.

What we claim is:

1. A machine for cutting frozen ensilage loose from the peripheral marginal area adjacent the walls of a silo and moving the cut ensilage toward the center of the silo comprising a carriage having a platform and front and rear struts extending downwardly from opposite sides of the platform, handle carriers extending upwardly at a forward incline from said platform, handles removably mounted in said carriers and longitudinally adjustable therein, a roller under the front portion of said platform extending transversely thereof and rotatably mounted between the front struts, a drum under the rear portion of said platform extending transversely thereof and rotatably mounted between the rear struts, said drum being of greater length than said roller and having opposite end portions projecting beyond opposite ends of the roller and terminating in close proximity to inner sides of the rear struts, teeth carried by said drum and projecting radially therefrom and following a line extending spirally about the drum with ends of the said line of teeth terminating at ends of the drum, a motor mounted upon the forward portion of said platform, a vertical drive shaft rotatably mounted at one side of the front portion of said platform and at its lower end geared to said drum, and means for transmitting rotary motion from said motor to said drum shaft and rotating the drum in a direction causing the spirally arranged teeth to move cut material toward the side of the drum at which the said shaft is mounted.

2. A machine for cutting frozen ensilage loose from the peripheral marginal area adjacent the walls of a silo and moving the cut ensilage toward the center of the silo comprising a carriage having a platform and front and rear struts extending downwardly from opposite sides of the platform, a roller under the front portion of said platform extending transversely thereof and rotatably mounted between the front struts, a drum under the rear portion of said platform extending transversely thereof and rotatably mounted between the rear struts, said drum being of not less length than said roller and terminating in close proximity to inner sides of the rear struts, teeth carried by said drum and projecting radially therefrom and following a line extending spirally about the drum with ends of the said line of teeth terminating at ends of the drum, a motor mounted upon the forward portion of said platform, a vertical drive shaft rotatably mounted at one side of the front portion of said platform and at its lower end geared to said drum, and means for transmitting rotary motion from said motor to said drum shaft and rotating the drum in a direction causing the spirally arranged teeth to move cut material toward the side of the drum at which the said shaft is mounted.

3. A frozen ensilage cutting and disintegrating machine particularly constructed to travel around the marginal peripheral portion of the surface of ensilage material adjacent the inside surface of the wall of a silo, said machine comprising a supporting structure, a rotary drum journaled on said frame structure transversely thereof and having teeth disposed in a path extending spirally about the drum and having an inner end and an outer end terminating substantially at opposite ends of the drum, a drive member operatively connected with the outer end of the drum, said inner end extending transversely of the adjacent supporting structure to permit cutting engagement of the teeth with material disposed substantially adjacent the inside wall surface of the silo, the convolutions of the spiral from the inner end to the outer end thereof being in a direction serving to convey material from the inner end to the outer end of the drum and positively urge said drum toward the inside surface of the wall of the silo.

4. A machine for cutting frozen ensilage loose from the peripheral marginal area adjacent the walls of a silo and moving the cut ensilage toward the center of the silo, said machine comprising a carriage, handle means mounted on said carriage and extending upwardly and forwardly therefrom, a roller journaled under the front portion of said carriage and extending transversely thereof, a drum supported from said carriage in transversely journaled relation thereto for rotation on an axis disposed parallel with the axis of rotation of said roller, said drum being of a length at least as long as said roller and extending transversely outwardly substantially to the side extremities of said carriage, teeth carried by said drum in radially projected relation thereto and following a line extending spirally about the drum with the ends of said line of teeth terminating at the ends of said drum, said drum extending the full width of the machine in close proximity to the sides of the carriage, a motor mounted on said carriage, and driving means interconnecting one end of said drum and said motor for transmitting rotation from said motor and said drum to produce rotary movement of the drum so that the spirally arranged teeth will move cut material toward the side of the drum to which the driving means is connected.

JOHN SOEHL.
WARREN C. HUFFMAN.

References Cited in the file of this patent

UNITED STATES PATENTS

| Number | Name | Date |
|---|---|---|
| 1,742,563 | Stidger | Jan. 7, 1930 |
| 1,790,758 | Montano et al. | Feb. 3, 1931 |
| 2,244,099 | Chase | June 3, 1941 |
| 2,250,391 | Ober | July 22, 1941 |
| 2,273,120 | Lindskog | Feb. 17, 1942 |
| 2,314,035 | Dontje | Mar. 16, 1943 |
| 2,520,066 | Rush | Aug. 22, 1950 |
| 2,537,586 | Huitema | Jan. 9, 1951 |